United States Patent Office 2,842,564
Patented July 8, 1958

2,842,564

PREPARATION OF DIAMINOANTHRAQUINONE SULFONIC ACIDS

Albert Bloom, Summit, and Leslie M. Schenck, Westfield, N. J., assignors to General Aniline & Film Corporation, New York, N. Y., a corporation of Delaware No Drawing. Application May 22, 1956
Serial No. 586,383

9 Claims. (Cl. 260—371)

The invention here presented is a procedure for the sulfonation of diaminoanthraquinone by the basic steps of forming a diaminoanthraquinone sulfate then suspending the sulfate in an inert high-boiling liquid and heating the material to complete the conversion to sulfonate.

The aminoanthraquinone sulfonates in general are materials of considerable value as intermediates for dyestuffs, pharmaceuticals and the like, and the monoaminoanthraquinone is readily sulfonated by a very simple treatment with sulfuric acid, either by baking, or by heating in solution, to give a satisfactory yield of the sulfonate. However all of the procedures used for the monoamine fail when applied to the diamines. Most of the procedures which work well with the monoamine, destroy the diamine so that no yield of the desired product is obtained. Apparently the sulfonation of the di- amines is much more difficult than the sulfonation of the monoamines, seemingly because of the presence of the second amino substituent, and the second amino substituent materially weakens the stability of the anthraquinone molecules. Accordingly it appears that at the necessary temperatures for sulfonation, the potent destructive effect of strong sulfuric acid, and the weaker molecular structure of the diamines together cause a fairly complete destruction of the molecule.

It is now found however that if a monosulfate of the diamine is first formed, so that there is no free sulfuric acid to exert its destructive action, the sulfate is suspended in an inert high-boiling liquid diluent, to permit of rapid circulation of the mixture during heating, whereby hot spots are avoided, it becomes then possible to sulfonate, not directly, but by a shift of the sulfur-oxygen radical from the position of sulfate of the amino group, to a position of sulfonate in the ring portion of the molecule. This procedure permits the use of a substantially lower temperature, permits the prompt and easy removal of the water of condensation and thus avoids the destruction of the primary portion of the molecule, since the temperature of reaction is low and there is no free acid; and in addition the water is eliminated as fast as formed, preventing the development of an equilibrium condition.

The reaction is primarily applicable to the 1,5-diaminoanthraquinones since these are the more important. However, it is also equally applicable to the 1,4-diaminoanthraquinones and in each instance a yield of 60% or better of the desired compound is obtained, the yield frequently being better than 90% and with careful handling, almost a 100% yield is obtainable. In addition there is relatively little contamination of the inert carrier diluent, and it may be reused for successive batches with only minor treatment. That is, the inert diluent may be reused, without purification or other treatment, for the processing of from 10 to 20 batches of the diamino sulfate, and when the amounts of impurities do become sufficiently great to interfere with the reaction, a simple fractional distillation is sufficient to purify the inert liquid for reuse.

The present procedure is applicable to the monoaminoanthraquinones, and it yields an excellent product. However it offers little advantage in the making of the monoamine sulfonate over prior processes; its principal value is in the manufacture of the polyaminoanthraquinone sulfonates, for which purpose it gives yields far better than any other process and is much simpler, cheaper and more effective than any of the prior procedures suggested.

Not only is the process applicable to all of the diamenoanthraquinones, but it is also applicable to higher aminoanthraquinones. While the triaminoanthraquinones and tetraminoanthraquinones are possible, they are at the present time chemical curiosities and have no commercial use. Nonetheless the present process is efficiently applicable to the sulfonation of such compounds.

Similarly the process is applicable to amines in general, and particularly the polyamines derived from anthracene, naphthalene, pyrene and the like.

Thus the procedure of the present invention permits of the making of sulfonates, not only of the polyaminoanthraquinones, but also of the more fragile, delicate, diamino aromatics and polyamino aromatics which are otherwise difficult or impossible to sulfonate except in low yield. Other objects and details of the invention will be apparent from the following description.

The primary raw material for this reaction is found principally in the several diaminoanthraquinones. The important raw material is the 1,5-diaminoanthraquinone but all of the other polyaminoanthraquinones are usable in the reaction. The matter of purity does not appear to be of great importance, except insofar as impurities present in the raw material tend to remain in the inert diluent, unless their boiling points are lower than the reaction temperature, which is the case with enough of the impurities, to give a substantial purifying effect.

Similarly the sulfuric acid may be of any convenient purity and it does not appear that the presence of small quantities of the heavy metals or other minor impurities is of importance; that is, the ordinary commercial grade of acid, either chamber acid, or catalyst acid is satisfactory. It is however desirable that a fairly strong acid be used, to avoid dilution of the diaminoanthraquinone sulfate with unnecessary amounts of water.

A third component is a high boiling inert diluent which may be trichlorobenzene or may be hexamethylbenzene, hexachlorobenzene, tribromobenzene, decalin, or petroleum mineral oils, etc.

In practicing the invention, an appropriate amount of the diaminoanthraquinone is weighed out, and a molecular amount of sulfuric acid, preferably as the monohydrate, or with a minimum of contained water, is then added to the diaminoanthraquinone and the mixture well stirred, until a homogeneous diaminoanthraquinone sulfate is obtained. This reaction is preferably conducted at a relatively low temperature, and the acid may be added in small portions, or in a small stream to avoid an undue temperature rise. Meantime the inert diluent is prepared in an appropriate reactor in which it can be heated to a suitable temperature, usually in the neighborhood of 175 to 225° C. The polyaminoanthraquinone sulfate is then stirred into the inert diluent liquid to form a suspension or solution therein. A sufficient amount of inert liquid is used so that the result is a thin slurry suitable for easy stirring. The temperature is then raised to the reaction point and held at that point for a substantial number of hours. At temperatures in the neighborhood of 200° C., a length of time of the general order of magnitude of 16 hours is found to be suitable since this gives a nearly complete reaction. At the end of this time the inert liquid is cooled to room temperature and the sulfonate filtered off. It may be noted that a major portion of the by-products and impurities are either volatile at the reaction temperature, or are soluble in the inert liquid and accordingly a relatively very high purity is obtained in the sulfonate.

It may be noted that the sulfonation yields a molecule of water for each molecule of sulfuric acid combined into the aminoanthraquinone; but the reaction temperature is well above the boiling point of water, and accordingly the water is evaporated from the mixture as fast as it is formed. This fact prevents the development of an equilibrium condition, and greatly facilitates the progress of the reaction.

The filtered out product may then be dissolved in water with a little ammonia, and the insoluble, unsulfonated residue removed; the purified product being recovered by acid precipitation.

*Example 1*

100 g. 1,5-diaminoanthraquinone sulfate (prepared by intimately mixing 1-5-diaminoanthraquinone with a molar quality of sulfuric acid) is suspended in 720 g. trichlorobenzene. The reaction mixture is slowly distilled to remove water formed during the sulfonation. After 16 hours at 200–215° C., the product and unreacted 1-5-diaminoanthraquinone is filtered from the trichlorobenzene and slurried in 1930 g. water and 50 g. ammonia at 90–95°. The dissolved product is filtered free of unreacted starting material, and the filtrate precipitated by addition of hydrochloric acid. The crystalline 1,5-diaminoanthraquinone-2-sulfonic acid is separated from the mother liquor by filtration, water washed and dried at 85° C. Yield: 64.3 g. (68% of theory).

*Example 2*

100 g. 1,4-diaminoanthraquinone sulfate (prepared by intimately mixing 1,4-diaminoanthraquinone with a molar quality of sulfuric acid) is suspended in 720 g. trichlorobenzene. The reaction mixture is slowly distilled to remove water formed during the sulfonation. After 16 hours at 200–215° C., the product and unreacted 1,4-diaminoanthraquinone is filtered from the trichlorobenzene and slurried in 1930 g. water and 50 g. ammonia at 90–95°. The dissolved product is filtered free of unreacted starting material, and the filtrate precipitated by addition of hydrochloric acid. The crystalline 1,4-diaminoanthraquinone-sulfonic acid is separated from the mother liquor by filtration, water washed and dried at 85° C. Yield: 64.3 g. (68% of theory).

*Example 3*

100 g. 1,8-diaminoanthraquinone sulfate (prepared by intimately mixing 1,8-diaminoanthraquinone with a molar quality of sulfuric acid) is suspended in 720 g. trichlorobenzene. The reaction mixture is slowly distilled to remove water formed during the sulfonation. After 16 hours at 200–215° C., the product and unreacted 1,8-diaminoanthraquinone is filtered from the trichlorobenzene and slurried in 1930 g. water and 50 g. ammonia at 90–95° C. The dissolved product is filtered free of unreacted starting material, and the filtrate precipitated by addition of hydrochloric acid. The crystalline 1,8-diaminoanthraquinone-sulfonic acid is separated from the mother liquor by filtration, water washed and dried at 85° C. Yield: 64.3 g. (68% of theory).

*Example 4*

Example 1 was repeated using hexamethylbenzene in place of the suggested trichlorobenzene. The reaction proceeded equally well to yield an excellent grade of 1,5-diaminoanthraquinone sulfonate.

*Example 5*

The procedure of Example 1 was repeated using tribromobenzene instead of the trichlorobenzene and again the similar results were obtained.

*Example 6*

The procedure of Example 1 was repeated using a good grade of saturated high-boiling mineral oil having an initial boiling point of about 250° C. As before an excellent reaction and an excellent product was obtained.

*Example 7*

The procedure of Example 1 was repeated except that the temperature was raised only to the range between 165 and 190° C. It was found that the reaction required a much longer time, on the order of 40 to 50 hours, and the long time resulted in the production of more decomposition products.

*Example 8*

The procedure of Example 1 was repeated using a temperature range between 225° C. and 235° C. The reaction proceeded at a considerably higher rate of speed, and was substantially complete in 6 to 8 hours. However the yields were sharply lower and a good deal more decomposition occurred.

Thus the process of the invention permits of the formation of diaminoanthraquinone sulfonates in the absence of free sulfuric acid and at temperatures sufficiently low to avoid thermal decomposition of the anthraquinone molecule.

While there are above disclosed but a limited number of embodiments of the process of the invention it is possible to provide still other embodiments without departing from the inventive concept herein disclosed, and it is therefore desired that only such limitations be imposed upon the appended claims as are stated therein or required by the prior art.

The invention claimed is:

1. A process for the production of polyaminoanthraquinone sulfonates comprising the steps in combination of forming a polyaminoanthraquinone sulfate suspending the sulfate in an inert high boiling liquid and heating the resulting sulfate to a temperature sufficiently high to cause a molecular rearrangement to form the sulfonate from the sulfate, with a minimum of by-products and minimum destruction of the anthraquinone molecule.

2. A process for the production of polyaminoanthraquinone sulfonates comprising the steps in combination of forming a polyaminoanthraquinone sulfate in the absence of free sulfuric acid, suspending the resulting sulfate in a high boiling inert liquid and heating the resulting sulfate to a temperature sufficiently high to cause the molecular rearrangement to form the sulfonate from the sulfate, with a minimum of by-products and minimum destruction of the anthraquinone molecule.

3. A process for the production of diaminoanthraquinone sulfonates, comprising the steps in combination of preparing a diaminoanthraquinone sulfate, suspending the sulfate in an inert high boiling liquid, and heating the suspension to a temperature between 175 and 225° C.

4. A process for the production of polyaminoanthraquinone sulfonates, comprising the steps in combination of preparing a polyaminoanthraquinone sulfate in the absence of free sulfuric acid, suspending the sulfate in an inert high boiling liquid, and heating the suspension to a temperature between 175 and 225° C.

5. A process for the production of polyaminoanthraquinone sulfonates, comprising the steps in combination of preparing a polyaminoanthraquinone sulfate in the absence of free sulfuric acid, suspending the sulfate in an inert high boiling liquid, and heating the suspension to a temperature between 175 and 225° C., filtering out the reaction product, dissolving in water and filtering out unreacted and water-insoluble impurities.

6. A process for the production of polyaminoanthraquinone sulfonates, comprising the steps in combination of preparing a polyaminoanthraquinone sulfate in the absence of free sulfuric acid, suspending the sulfate in an inert high boiling liquid, and heating the suspension to a temperature between 175 and 225° C., filtering out the reaction product, dissolving in water and filtering out unreacted and water-insoluble impurities and precipitating the pure sulfonate by the addition of hydrochloric acid.

7. A process for the production of polyaminoanthraquinone sulfonates, comprising the steps in combination of preparing a polyaminoanthraquinone sulfate in the absence of free sulfuric acid, suspending the sulfate in an inert high boiling liquid comprising trichlorobenzene, and heating the suspension to a temperature between 175 and 225° C., filtering out the reaction product dissolving in water and filtering out unreacted and water-insoluble impurities and precipitating the pure sulfonate by the addition of hydrochloric acid.

8. A process for the production of polyaminoanthraquinone sulfonates, comprising the steps in combination of preparing a polyaminoanthraquinone sulfate in the absence of free sulfuric acid, suspending the sulfate in an inert high boiling liquid comprising hexamethylbenzene, and heating the suspension to a temperature between 175 and 225° C., filtering out the reaction product dissolving in water and filtering out unreacted and water-insoluble impurities and precipitating the pure sulfonate by the addition of hydrochloric acid.

9. A process for the production of polyaminoanthraquinone sulfonates, comprising the steps in combination of preparing a polyaminoanthraquinone sulfate in the absence of free sulfuric acid, suspending the sulfate in an inert high boiling liquid comprising high boiling mineral oil, and heating the suspension to a temperature between 175 and 225° C., filtering out the reaction product dissolving in water and filtering out unreacted and water-insoluble impurities and precipitating the pure sulfonate by the addition of hydrochloric acid.

References Cited in the file of this patent

UNITED STATES PATENTS

| | | |
|---|---|---|
| 1,873,300 | Davidson et al. | Aug. 23, 1932 |
| 2,360,010 | Ogilvie | Oct. 10, 1944 |